US007730906B2

(12) United States Patent
Kleinert et al.

(10) Patent No.: US 7,730,906 B2
(45) Date of Patent: Jun. 8, 2010

(54) SOLENOID WITH PATH CONVERTER

(75) Inventors: Dieter Kleinert, Memmingen (DE); Georg Scherer, Kirchheim (DE); Helmut Mang, Memmingen (DE)

(73) Assignee: Dipl.-Ing. Wolfgang E. Schultz, Memmingen (DE)

( * ) Notice: Subject to any disclaimer, the term of this patent is extended or adjusted under 35 U.S.C. 154(b) by 317 days.

(21) Appl. No.: 11/452,228

(22) Filed: Jun. 14, 2006

(65) Prior Publication Data

US 2006/0284132 A1 Dec. 21, 2006

(30) Foreign Application Priority Data

Jun. 15, 2005 (DE) ...................... 10 2005 027 780

(51) Int. Cl.
*F16K 31/04* (2006.01)

(52) U.S. Cl. ........................... 137/625.65; 137/625.26; 251/77; 251/129.08; 251/322

(58) Field of Classification Search ............ 137/625.26, 137/625.65; 251/129.08, 129.15, 129.19, 251/322, 77, 337
See application file for complete search history.

(56) References Cited

U.S. PATENT DOCUMENTS

| | | | | |
|---|---|---|---|---|
| 3,018,035 | A | 1/1962 | Pinton | 234/108 |
| 3,211,417 | A * | 10/1965 | Ray | 251/129.2 |
| 3,527,253 | A * | 9/1970 | Harpman | 137/625.27 |
| 3,791,408 | A * | 2/1974 | Saitou et al. | 137/529 |
| 3,799,203 | A * | 3/1974 | Doutt | 137/625.65 |
| 3,988,706 | A | 10/1976 | Springer | 335/264 |
| 4,548,233 | A * | 10/1985 | Wolfges | 137/529 |
| 4,886,091 | A * | 12/1989 | Coleman | 137/625.65 |
| 5,139,227 | A * | 8/1992 | Sumida et al. | 251/129.08 |
| 5,533,249 | A * | 7/1996 | Wakeman | 29/605 |
| 2005/0076959 | A1 * | 4/2005 | Yamamoto | 137/596.17 |
| 2005/0099256 | A1 | 5/2005 | Subramanian | 335/256 |

FOREIGN PATENT DOCUMENTS

| | | |
|---|---|---|
| GB | 638005 | 5/1950 |

* cited by examiner

*Primary Examiner*—John Rivell
*Assistant Examiner*—Craig M Schneider
(74) *Attorney, Agent, or Firm*—Jacobson Holman PLLC

(57) ABSTRACT

A solenoid including an armature movable in an armature room and a coil which can be flowed through by current. When it is flowed through by current the armature moves. The armature interacts with an armature bar. A path converter is provided between the armature and the armature bar.

12 Claims, 2 Drawing Sheets

SOLENOID WITH PATH CONVERTER

BACKGROUND OF THE INVENTION

Figure 1:
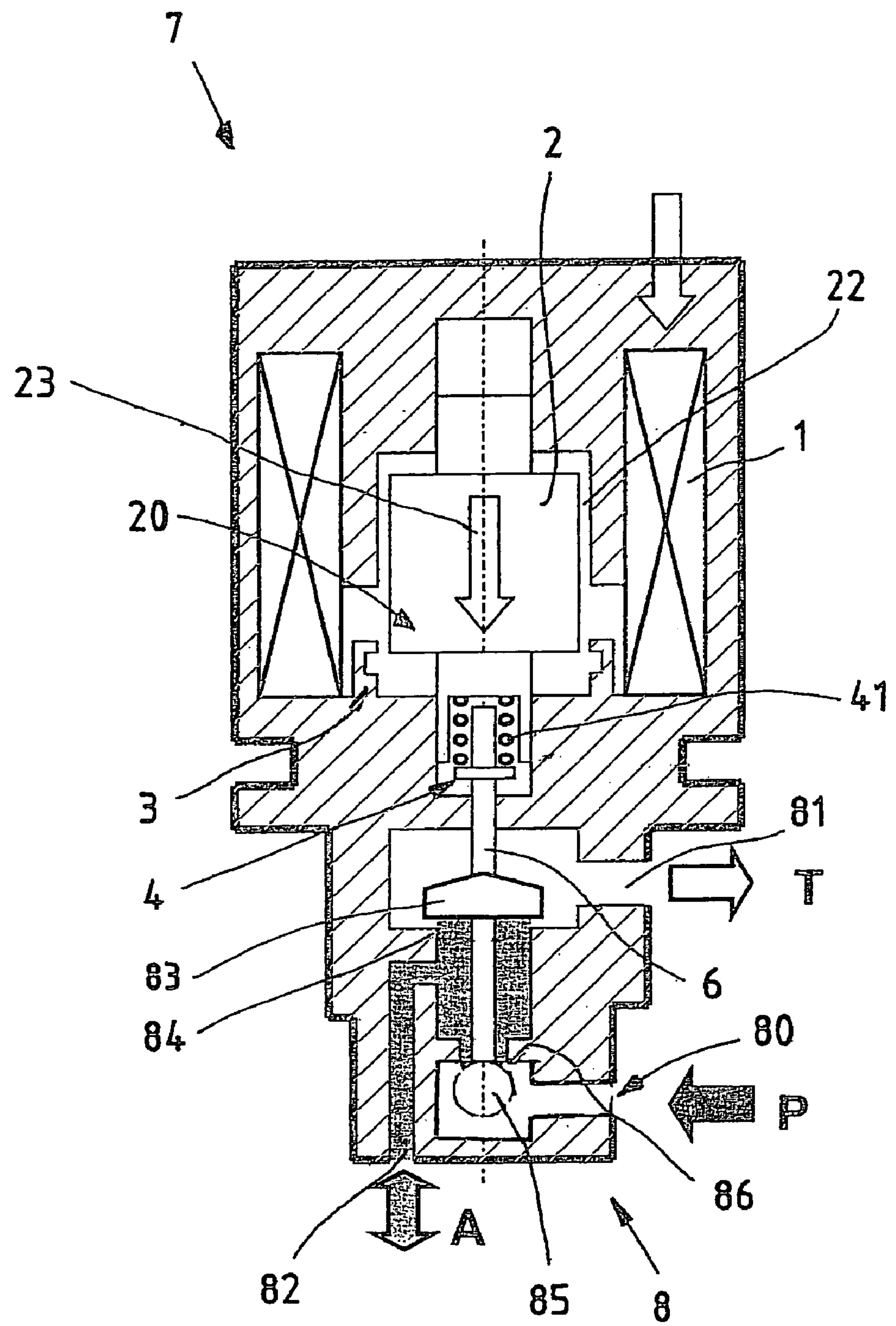

The invention refers to a solenoid comprising an armature movable in an armature room, and a coil which can be flowed through with current, wherein the coil generates, when flowed through with current, a magnetic field which serves for moving the armature, and the armature acts on an armature bar.

The solenoids described in the beginning are sufficiently known. They serve, for example, as control or circuit elements wherein by means of the solenoid a corresponding control or circuit part is moved. This movement is transmitted by the armature to an armature bar, the armature bar then influencing or operating the control, respectively the circuit member. For the connection between armature and armature bar it is known either to couple them rigidly or to connect them loosely.

In the state of the art also a solenoid valve is known which serves for adjustment of a pressure and/or a flow of a hydraulic fluid. This solenoid valve with axle absorption serves for reducing the vibrations occurring in this kind of valves by changing the resonance level of the mass spring system known from the state of the art. This solenoid valve has an armature by means of which a coil can be shifted.

There are cases of application where only a certain stroke is required at the armature bar. If a relatively small stroke is required for that possibly a separate solenoid with a small stroke has to be developed and designed, which is expensive.

BRIEF ABSTRACT OF THE INVENTION

It is therefore an object of the invention to find an arrangement by means of which different stroke intervals can be covered with one and the same solenoid.

This problem is solved by means of a solenoid as described in the beginning, and it is suggested that between armature and armature bar a path converter is provided. It has to be pointed out in this connection that as armature bar the region is understood which carries the corresponding operating elements, for example sealing body, control or circuit part, and so on. The invention also comprises a solution where the armature bar is divided, and the path converter is arranged between the two armature bar parts, and the first armature part which is allocated to the armature is moved by it. This armature bar part has to be seen as armature.

By means of this invention it is achieved that, for example, with a large and therefore economically produced series of solenoids, a large range of different strokes which the armature has to operate is covered.

This solution according to the invention leads to surprising results. By means of this suggestion according to the invention it is also achieved, however, that now the solenoid can be optimised for different requirements, and that is even if this optimising processes at the solenoid have the result that the armature carries out a larger stroke. By means of the equipment according to the invention with the path converter this increased stroke can be compensated again, and an optimising of the solenoid altogether is achieved, for example with respect to its power performance (respectively its characteristic) and the stroke of the armature bar. It may be possible to optimise contrasting characteristics of the solenoid together and to achieve a clearly improved apparatus. A solenoid with such an equipment has therefore a high flexibility, and can be applied in a number of applications.

The solenoid according to the invention has here a path converter which, at first, does not carry out a power transformation. Besides the losses of friction, the path converter changes only the stroke. Alternatively to that, of course, also arrangements are possible where the path converter is designed like a gear or a lever arrangement, and it carries out a power transformation to about that degree to which also a reciprocal path conversion with respect to the conservation of energy is carried out. Such a design makes the arrangement according to the invention even more flexible as it is not directly limited to the power spectrum provided by the solenoid, but it becomes more flexible even here.

Thus it is provided, according to a modification of the invention, that by means of the path converter a reduction of the stroke of the armature bar in relation to the stroke of the armature is carried out. The motions of the stroke of the armature are reduced accordingly by the path converter and transferred to a reduced stroke of the armature bar.

In a preferred modification of the invention it is provided that the path converter consists of at least one compressible spring. According to the invention it is also provided that one or even more springs are arranged in the path converter. The arrangement of the springs is here possible in different ways. In the first modification it is provided, for example, that several compressible springs are arranged one behind the other. In another modification several springs are arranged parallel to each other.

By means of the movement of the armature a compression of the spring, respectively the springs, is carried out. Thus the springs act as path storage, and hold a certain path, however, pass on the same measure of power at the other side to the armature bar.

In a preferred modification of the invention it is provided that the path converter is arranged loosely between the armature bar and the armature. Such an arrangement leads to a relatively easy assembling, as special orientations of the path converter to the armature bar, respectively to the armature, are not decisive. However, it is alternatively also possible to design the path converter, for example, fixedly with the armature bar or fixedly with the armature, and to assemble as pre-fabricated component.

In a preferred modification of the invention it is suggested that the path converter has a housing which holds the spring and a receptacle. Cleverly the spring is arranged between the receptacle and the housing so that a space-saving modification becomes possible. In this respect namely the housing also acts as guide for the spring, respectively for the receptacle.

It is provided here that, for example, the armature interacts with the housing or the receptacle, and the armature bar interacts with the receptacle or with the housing. The invention comprises both modifications. It is possible that the armature interacts with the housing, that means it is in contact with it, or it interacts with the receptacle. The other element, the armature bar, then interacts, for example, with the receptacle or with the housing.

In a development of the solution according to the invention it is suggested that the armature bar is guided by the spring or springs over a cylindrical, respectively pocket-like, receptacle. In contrast to the solutions known from the state of the art the armature bar is not guided loosely in a recess, but a housing designed pot-like or tube-like holds one or more springs as well as a receptacle. The springs are supported, on the one hand, by the bottom of the housing, and, on the other hand, by a flange of the receptacle. The armature bar is in this receptacle, and that means even in contact with the bottom. Thus the armature bar is guided, according to the present modification of the invention, by springs over a cylindrical or pocket-like receptacle, and is not located loosely in a recess. The receptacle here is not an operating part, either, as it is necessary with the solutions known from of the state of the art. The modification described before is therefore more convenient because it is less expensive.

A development of the invention also suggests that the armature bar is guided by a cage which is in contact with the armature or is inserted in it.

In a preferred modification of the invention it is provided that the receptacle is designed pocket-like. Such a pocket-like design is realised as space-saving arrangement. The arrangement is or can be chosen here in particular in such a way that the pocket ends, in the not-compressed condition, within the spring, in the compressed condition, however, the housing has suitable recesses which allow that the receptacle can be pushed out of the spring in the housing in downward direction so that a larger range of spring can be used and, nevertheless, a very space-saving arrangement is realised.

Preferably the armature bar interacts with the receptacle in such a way that the armature bar is in contact with the bottom of the receptacle. The armature bar has often a clearly smaller diameter than the armature so that such a geometric arrangement is convenient because of space reasons. Of course, also a reverse arrangement is possible.

Conveniently it is provided that the receptacle has a supporting shoulder or a supporting flange for the spring. It is possible, according to the invention, that one or more springs are arranged parallel to each other. Exactly several springs, that is a spring package arranged parallel, is supported cleverly by the respective supporting shoulders. A supporting flange is convenient in particular with one spring as then the spring surrounding the receptacle has a uniform supporting surface as supporting flange at its disposal.

Another aspect of the solution according to the invention provides in another modification that a cantilevered support of the armature bar is provided in such a way that the end of the armature bar immerses in a supporting flange designed as spring support or in a supporting shoulder. According to that this cantilever support is designed in such a way that the end of the armature bar may immerse in the spring support, however, is not guided in it. It has to be emphasised here that another modification of the invention provides that explicitly a corresponding recess for the guide of the armature bar is not necessary.

As described, the spring, respectively the spring package, is arranged between the receptacle on the one side and the housing on the other side. Here the spring is supported by the receptacle through the described supporting shoulder or the supporting flange as well as by the housing. The housing is designed cleverly, for example, pot-like so that the spring is supported by the bottom of the housing.

Cleverly in another modification according to the invention it is provided that the active direction of the spring, respectively the springs, the longitudinal extension of the armature bar as well as the movement of the armature are parallel, respectively essentially parallel. Such an arrangement is convenient, as just the movement of the armature has to be transmitted to the armature bar. It is, of course, possible to select accordingly flexible arrangements, if, for example, because of the limited condition of assembling an angling of the direction of movement is required. One has, for example, to deviate from an accordingly parallel arrangement, for example, with a lever arrangement for which, for example, by means of the lever principles also rotational movements and so on can be carried out. Such an arrangement can also be used, for example, for deflecting the power. The path converter thus does not only perform a change of the stroke, but, if necessary, also a change of the active direction of the power.

In a preferred modification of the invention it is suggested that the spring, respectively the springs, has/have different spring constants depending on the grade of compression. The spring constant is defined as the length adjustment of a spring because of an application of power. If now an arrangement is chosen where according to the grade of compression different spring constants are available by means of that the transmission line of the path converter can be varied. Therefore it is possible to use, for example, in a first spring path to use a relatively weak, that means well compressible, spring so that by means of a suitable applying of power a large path compensation, that means a smaller path conversion, is carried out. If a corresponding grade of compression of the springs is reached, then, for example, a spring with another, decisively harder, spring constant becomes active which leads to a direct transfer of the armature movement to the armature bar. Such a design makes it possible to realise even a not-linear transmission relation in the path converter. It is possible, in particular, to choose the arrangement in such a way that corresponding characteristics of the solenoid are compensated or emphasised. The design with the different spring constants is done, for example, in such a way that several springs with respectively different spring constants are provided which, in a suitable way, are active and not active. However, it is also possible to use one or more springs each of which has a different spring constant, that means that they already have the desired behaviour. The invention can be used very flexibly in this field.

A development of the invention also suggests that the projection point or the projection points of the spring(s) is/are arranged axially shifted at the end of the armature bar. Compared with the state of the art, which has been described above, the projection point(s) of the spring is/are arranged axially shifted at the end of the armature bar with reference to this solution. However, it is made sure that, for example, a circle symmetric arrangement can be realised in such a way that the receiver is set almost completely in the spring. The arrangement is, in this respect, also designed concentrically in order to avoid tilting as far as possible.

Cleverly it is provided in a modification of the invention that the path converter transmits the movement of the armature without change to the armature bar in a limiting compression. The limiting compression can be controlled, for example, because of the design of the spring, the selected spring constant, the selected geometric dimensions and so on. Compression is here the reduction of the stroke of the armature in the path converter in order to provide a reduced stroke of the armature bar. In a limiting compression, for example, all spring paths of the used springs are used up, and the armature is in contact with the armature bar. In this case the movement of the armature is transmitted without change to the armature bar. Such behaviour is convenient, for example, with terminal positions of the armature in the solenoid.

In a preferred modification of the invention it is provided that the armature, in particular the front region of the armature, immerses in a control cone by the movements caused by the magnetic field, and the mean gap width between the armature and the control cone changes with the immersion path of the armature in the control cone. By such an arrangement a means is provided for influencing the action of the solenoid, in particular deviating from the linear connection. The modification according to the invention presented here leads in particular to the formation of a progressive control characteristic because, for example in the bottom control region (with low current) changes of the control current lead only to a relatively small change of power, however, in the region flowed through with large current the same change of current leads to a considerably larger change of power. Such a progressive behaviour is convenient, for example, with pressure control valves. Such an arrangement is in particular described in detail in the German patent application filed simultaneously with the present application by the same applicant with the title “Solenoid with Control Cone”. The contents of this patent application are completely referred to at this point. It is often convenient here to build in, with such a control characteristic, consequently a path conversion in order to transform the stroke movement provided by the armature in such a way that corresponding elements, for example a valve, can be operated with an armature bar. Exactly the interaction of these two elements is very convenient in the respective application cases as it is possible to optimise the solenoid, respectively a pressure control valve, which is also part of the invention, to different parameters. By means of that it is also possible to optimise characteristics individually which otherwise are contrary to each other.

Thus the invention also comprises a pressure control valve which comprises a solenoid as described, and where the solenoid is connected with a valve, wherein the armature bar carries a sealing body closing a seal receiver, and the position of the armature controls the position of the sealing body to the seal receiver, and besides the armature bar acts on a second sealing body which closes, in the current-less condition of the solenoid, a second seal receiver.

The result is now that in the first phase of the immersion of the armature in the control cone the armature bar pushes out the second sealing body of the second sealing receiver. But if now this second sealing body is accordingly pressurised it is convenient that in the first phase of the movement of the armature also the path converter performs a transformation of power so that the armature bar pushes the second sealing body out of the second seal receiver.

If the armature is arranged cleverly with respect to the control cone, however, it is now possible that the development of power of the solenoid in the first phase of its immersion movement in the control cone is so large that the second sealing body is pushed out of the seal receiver.

BRIEF DESCRIPTION OF THE DIFFERENT VIEWS OF THE DRAWINGS

The invention is shown schematically in the drawing.

Figure 2:
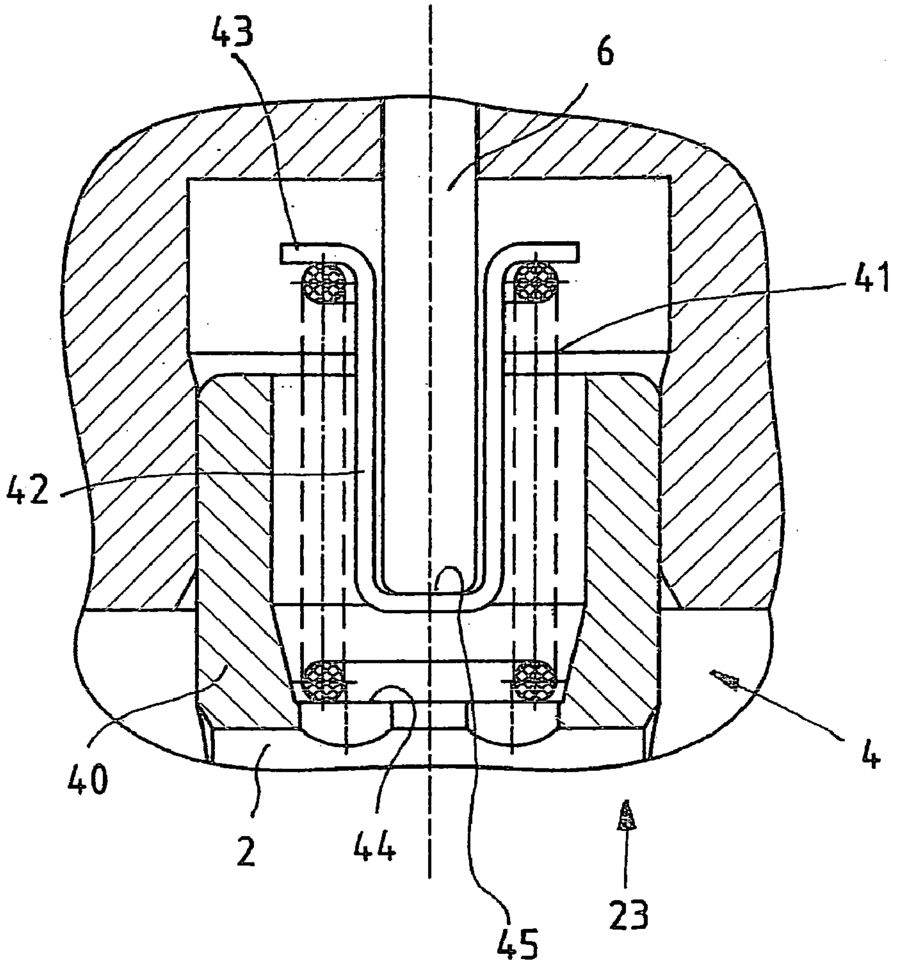

In the drawings:

FIG. 1 a schematic view of the solenoid according to the invention with a valve, respectively one of the pressure control valves according to the invention, FIG. 2 in an enlarged view the path converter of the solenoid according to the invention.

DETAILED DESCRIPTION OF THE PREFERRED EMBODIMENT

The solenoid 7 according to the invention can in particular be seen in FIG. 1. The solenoid 7 comprises an armature 2 movable in an armature room 22. The armature room 22 is surrounded by the coil 1. The coil 1 generates a magnetic field, when flowed through by current, which effects that the armature 2 is moved downward (arrow 23).

In the view shown in FIG. 1 there is the control cone 3 in the bottom region of the armature room 22. When flowed through by current, the armature 2 moves in the control cone 3, the particular design of the control cone 3 leading to a progressive run of the characteristic.

The example shown in FIG. 1 shows a valve 8 driven by the solenoid 7 which is called, for example, pressure control valve. For that the armature 2 acts on an armature bar 6 which is joined below the armature 2 outside the armature room 22.

In the example shown here a path converter 4 is arranged between the armature 2 and the armature bar 6. The path converter 4 effects a transformation of the stroke carried out by the armature 2. This means that the stroke of armature 2 is not transmitted to the same extent to the armature bar 6, but to an accordingly reduced extent. As shown here, one or more springs 41 of the path converter 4 are compressed so that in this example a reduction of the path, respectively of the stroke, is carried out without a transformation of power. Of course, also a transformation of the path is possible with a corresponding transformation of the stroke, for example as in a gear or in a lever arrangement. By means of such an arrangement it is achieved, for example, that a comparatively large stroke of the armature 2, which is not necessary for the desired use, is restricted, respectively limited, to a suitable stroke dimension.

Also an enlargement of the stroke (as kinematic reversal) by the path converter 4 is part of the invention.

Below the path converter 4, as described, the armature bar 6 is joined. The armature bar 6 thus is movable relatively to the armature 2, the path converter 4 has a suitable receptacle, respectively joining, arrangement for the armature 2, on the one hand, as well as for the armature bar 6, on the other hand.

The shown application as pressure control valve is, for example, applied in suitable hydraulic circuits. The hydraulic operating pressure is connected as pressure P to the inlet 80. The inlet 80 is here part of the valve 8 which is joined below the solenoid 7.

The bottom end of the armature bar 6 acts on a second sealing element 85 which is designed here, for example, as ball. In current-less condition the armature 2 is shifted totally upward, the front region 20 does not immerse in the control cone. Because of the operating pressure P the ball-like second sealing element 85 is pushed in the second seal receiver 86. Thus the valve is sealed reliably. When flowed through with a certain current, the armature 2 is shifted downward, the armature bar 6 follows to the same extent, or, according to the conversion relation of the path converter 4, this movement, and pushes the second sealing element 85 out of the seal receiver. At the same, time the first sealing element 83 which is arranged fixedly on the armature bar 6 moves in the direction of the first seal receiver 84, and diminishes the passage also shown here. By means of the control characteristic of the solenoid now here a corresponding pressure control at the control outlet 81 is carried out. Through the second outlet 82 the superfluous hydraulic fluid is removed. The arrangement is here chosen in such a way that, when the solenoid is fully flowed through by current, the magnetic field of the coil 1 pulls the armature 2 completely in the control cone 3, and thus pushes the first sealing element 83 hard with a high application of power in the first seal receiver. The arrangement is here dimensioned in such a way that it is secured that the power generated by the solenoid is surely sufficient for holding the sealing element 83 securely in the first seal receiver 84 against a corresponding operating pressure P. This is carried out by a correspondingly progressive characteristic, wherein with a correspondingly small change of the current with absolutely high current a large change of the power is the result (with an application of pressure control a large change of pressure).

In FIG. 2, in particular the path converter according to FIG. 1 is shown enlarged in detail. The arrangement shown here is just the other way around compared to the one in FIG. 1, that means that the armature 2 is in FIG. 1 above the path converter 4, in FIG. 2 it is below.

By means of the movement of the armature 2 along the arrow 23 the armature 2 (in FIG. 2) moves from below to the top. The armature 2 here acts on the path converter 4 which is formed essentially by a housing 40. The housing 40 is here designed essentially pot-like or tube-like, and holds one or more springs 41 as well as the receptacle 42.

The receptacle 42 here is the connection with the armature bar 6. For that purpose the receptacle 42 is designed pocket-like and has an interior width which is sufficient to hold the armature bar 6. In the view shown here the receptacle 42 is designed U-like, the armature bar 6 being in contact with the bottom 45 of the receptacle 42 (the web of the U joining limbs). By means of that the power which is introduced by the armature 2 transmitted to the armature bar 6. At the top end of the pocket-like receptacle 42 the edge is folded to the exterior in order to form a contact edge 43 (or even support shoulder 43 or support flange 43) for the spring 41. The arrangement is chosen here, for example, circle symmetrical, the receptacle 42 is almost completely in the spring 41. The arrangement is in this respect also designed concentrically in order to avoid tilting as far as possible.

The spring 41 is thus supported, on the one hand, by the contact edge 43 of the receptacle 42, and, on the other hand, by the bottom 44 of the housing of the pot-like housing 40. If now a movement of the armature is carried out according to arrow 23, first of all the spring 41 is compressed to a certain extent. The housing 40 and/or also the region of the armature 2 below the receiver 42 may possibly have another receptacle in order to allow for a corresponding back spring region. Thus first of all a compression of the path converter 4 occurs, and, together with that, a reduction of the armature bar stroke in relation to the stroke of the armature.

The path converter 4 is here, for example, arranged in the solenoid at the bottom end of the core, wherein above the contact edge 43 there is still a suitable free space so that the movement of the armature 6, respectively the receptacle 42, is not limited too fast.

Although the invention has been described by exact examples which are illustrated in the most extensive detail, it is pointed out that this serves only for illustration, and that the invention is not necessarily limited to it because alternative embodiments and methods become clear for experts in view of the disclosure. Accordingly changes can be considered which can be made without departing from the contents of the described invention.

The invention claimed is:

1. Solenoid comprising an armature movable in an armature room, a control cone in a bottom region of the armature room, the armature being movable in the control cone, a coil passing current to generate a magnetic field for moving the armature, and the armature acting on an armature bar, a path converter located between the armature and the armature bar, the path converter including at least one compressible spring, and a connection point of the at least one compressible spring and an end of the armature bar being arranged axially shifted at the end of the armature bar with the end of the armature bar and an end of the at least one compressible spring being spaced from each other so that a force of the at least one compressible spring is biased against the end of the armature bar, the path converter having a housing holding the at least one compressible spring and a cylindrical pocket receptacle, the end of the armature bar being located in said pocket receptacle, the pocket receptacle being concentrically mounted almost completely inside the at least one compressible spring for avoiding tilting of the armature bar.

2. Solenoid according to claim 1, wherein the path converter effects a reduction of the stroke of the armature bar compared with a stroke of the armature, and the path converter also performs a transformation of power.

3. Solenoid according to claim 1, wherein movement of the armature effects a compression of the at least one compressible spring, and the path converter is arranged loosely between the armature bar and the armature.

4. Solenoid according to claim 1, wherein the receptacle has one of a supporting shoulder and a supporting flange for the at least one compressible spring.

5. Solenoid according to claim 1, wherein a cantilevered support of the armature bar is provided in such a way that an end of the armature bar immerses in one of a supporting flange and a supporting shoulder designed as a spring support.

6. Solenoid according to claim 1, wherein the at least one compressible spring is supported on a bottom of the housing.

7. Solenoid according to claim 1, wherein the at least one compressible spring has a different spring constant according to a grade of compression.

8. Solenoid according to claim 1, wherein the armature has an armature front region, and the armature front region immerses in the control cone through a motion caused by the magnetic field, and a mean gap width between the armature and the control cone changes with an immersion path of the armature in the control cone.

9. Solenoid according to claim 1, wherein the armature bar acts on at least one sealing element of a valve.

10. Pressure control valve comprising a solenoid including an armature movable in an armature room and a coil passing current, the coil, when passing current, generating a magnetic field for moving the armature, and the armature acting on an armature bar, a path converter located between the armature and the armature bar, the path converter including at least one compressible spring, a connection point of the at least one compressible spring and an end of the armature bar being arranged axially shifted at the end of the armature bar with the end of the armature bar and an end of the at least one compressible spring being spaced from each other so that a force of the at least one compressible spring is biased against the end of the armature bar, and a valve connected with the solenoid, the armature bar carrying a sealing body which also closes a seal receiver, and a position of the armature controlling a position of the sealing body with respect to the seal receiver, and the armature bar acting on a second sealing body which closes a second seal receiver in a current-less condition of the solenoid, the path converter having a housing holding the at least one compressible spring and a cylindrical pocket receptacle, the end of the armature bar being located in said pocket receptacle, the pocket receptacle being concentrically mounted almost completely inside the at least one compressible spring for avoiding tilting of the armature bar.

11. Pressure control valve according to the preceding claim 10, wherein during a first phase of immersion of the armature in a control cone the armature bar pushes out the second sealing body from the second seal receiver.

12. Pressure control valve according to claim 10, wherein in a first phase of movement of armature the path converter also performs a force transformation so that the armature bar pushes out the second sealing body of the second seal receiver.

* * * * *